United States Patent [19]
Nishimura et al.

[11] 3,794,902
[45] Feb. 26, 1974

[54] BACKLASH COMPENSATING APPARATUS FOR NUMERICALLY CONTROLLED MACHINE TOOL

[76] Inventors: Hideo Nishimura; Kimio Kanou, both of 2-52, Shintomi-cho, Kariya-shi, Aichi-ken; Tamotsu Ishigaki, 1-3, Koue, Chiryu-shi, Aichi-ken, all of Japan

[22] Filed: Feb. 12, 1973

[21] Appl. No.: 331,370

[30] Foreign Application Priority Data
Feb. 12, 1972  Japan.............................. 47-15018

[52] U.S. Cl............................... 318/630, 318/632
[51] Int. Cl. ............................................ G05b 11/01
[58] Field of Search........................... 318/630, 632

[56] References Cited
UNITED STATES PATENTS
3,560,830  2/1971  Steinberg............................ 318/630
3,466,515  9/1969  Madsen et al. ................. 318/630 X
3,491,278  1/1970  Stobbe................................ 318/632
3,602,791  8/1971  Stevenson.......................... 318/632
3,689,821  9/1972  Slawson............................. 318/632

*Primary Examiner*—B. Dobeck
*Attorney, Agent, or Firm*—Oblon, Fisher, Spivak, McClelland & Maier

[57] ABSTRACT

The backlash in the feed screw system of a machine tool is automatically compensated so as to obtain a high degree of machining accuracy. When the direction of the feed motion is required to be changed, the normal feed motion is temporarily interrupted, and backlash compensating data are supplied to a shift register, which is also used for normal feed operation, so that backlash compensation may be accomplished. Thereafter, a pulse generator supplies a series of pulse signals to the shift register to trigger drive pulse signals which are supplied to a pulse motor, the drive pulse signals being generated in accordance with the backlash compensating data.

6 Claims, 4 Drawing Figures

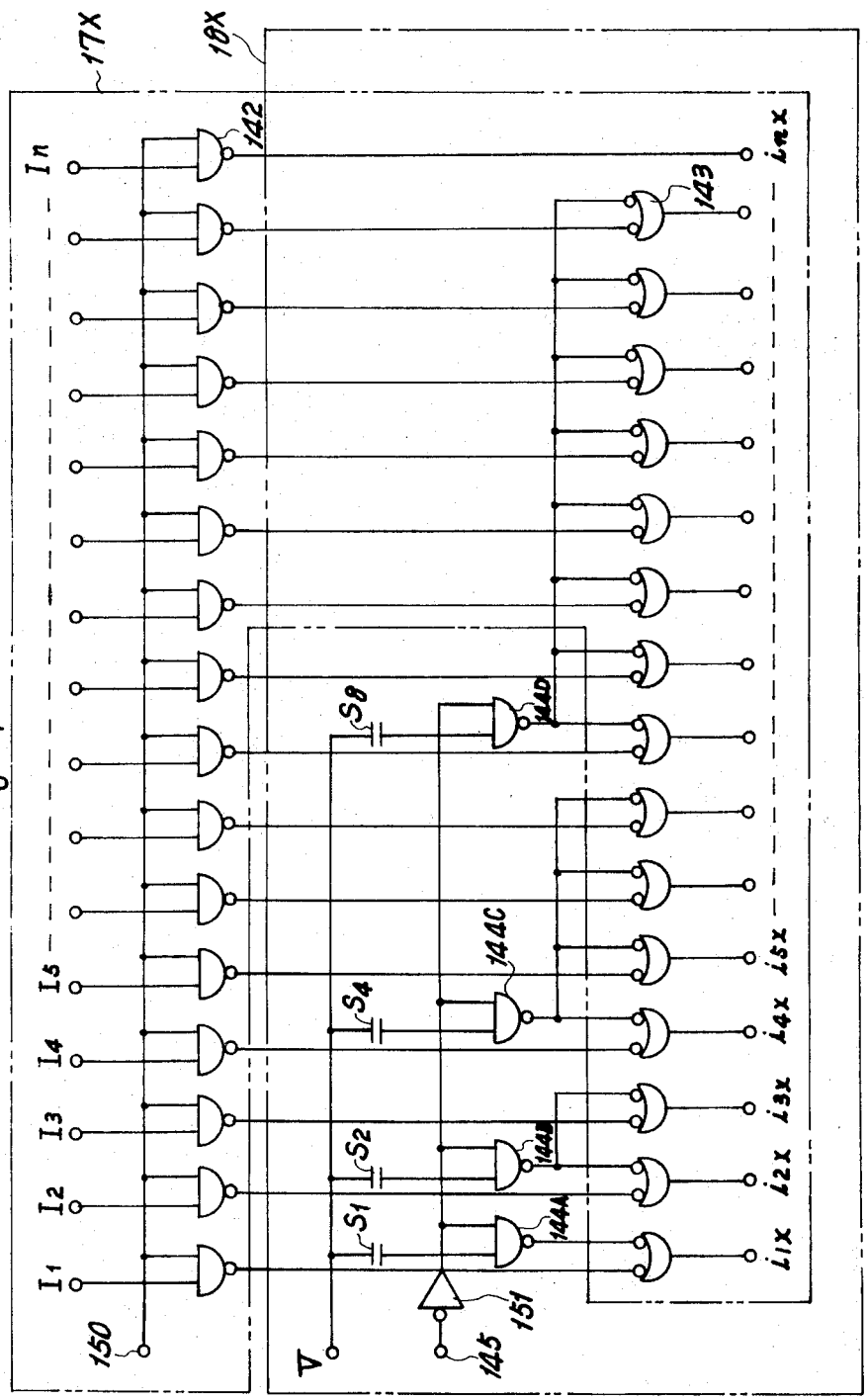

3,794,902

BACKLASH COMPENSATING APPARATUS FOR NUMERICALLY CONTROLLED MACHINE TOOL

BACKGROUND OF THE INVENTION

1. Field of the Invention

The present invention relates generally to numerically controlled machine tools, and more particularly to a backlash compensating apparatus for use with numerically controlled machine tools.

2. Description of the Prior Art

Direct numerical control (DNC) systems, which control a plurality of numerically controlled machine tools, have recently attracted considerable attention.

In the DNC system, the number of the machine tools controlled is limited in accordance with the capacity of the central control computer. Generally about 10 machine tools is the approximate upper limit for computers of small capacity.

The cost of the control system is inevitably high and therefore, the number of the machine tools which are controlled by the control system is always preferably maximized to thereby reduce the cost of the control system per machine tool. Accordingly, a control system may be used in combination with a machine control unit which accepts the pulse distribution data processed by the central computer, and thereafter supplies additional pulse signals to reduce the amount of work which must be done by the central computer. Thus, devices such as the present invention which automatically compensates for backlash, supplement the central computer, and permit control of more machine tools by the central control system.

SUMMARY OF THE INVENTION

Accordingy; one object of the present invention is to provide a backlash compensating apparatus for automatically eliminating the backlash of a feed screw system.

Another object of the present invention is to provide a backlash compensating apparatus utilizing the main portion of the normal machine control system.

Still another object of the present invention is to provide backlash compensating apparatus wherein the backlash compensating operation is performed only when the directions of present and previous feed motion are changed.

Briefly, according to the present invention, the direction of the feed motion is compared with the direction of the previous feed motion before pulse distribution data are supplied to shift registers. When the directions between the present and the previous feed motions are different from each other, a backlash compensation detecting circuit generates a signal so that backlash compensating data are supplied to the shift register instead of the pulse distribution data. At the same time, a subtracting counter is made inoperative by the signal, and thereafter the pulse generator supplies a series of pulse signals to the shift register so that the shift register supplies drive pulse signals in the same manner as the normal feed operation.

When a shift finish detecting circuit detects the fact that the same number of the pulse signals as the normal feed operation has been supplied to the shift register, the backlash compensating operation is stopped and the normal feed operation is again started.

BRIEF DESCRIPTION OF THE DRAWINGS

Other objects and features of the present invention will become apparent to those skilled in the art as the disclosure is made in the following description of a preferred embodiment of the invention, as illustrated in the accompanying sheets of drawings in which.

BRIEF DESCRIPTION OF THE PREFERRED EMBODIMENT

Figure 1:
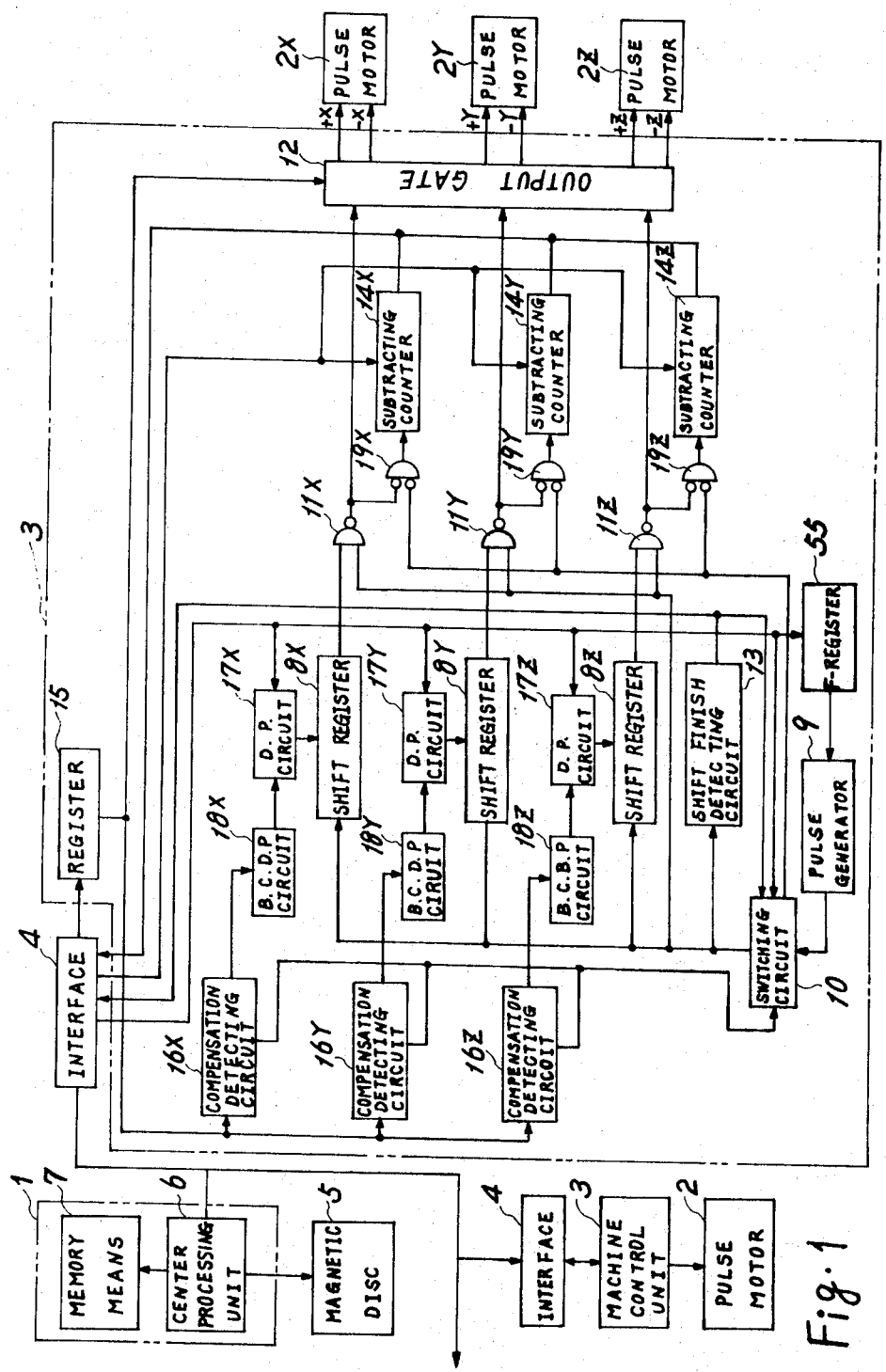
FIG. 1 is a block diagram showing the backlash compensating system according to the present invention.

Referring now to the drawings, wherein like reference numerals designate identical or corresponding parts throughout the several views, and more particularly to FIG. 1 thereof, a computer 1 controls a plurality of numerically controlled machine tools, pulse motors 2 of each machine tool being connected to a machine control unit 3 which controls the same in accordance with pulse distribution data supplied through an appropriate interface 4 from the computer 1. The computer 1 is preferably a Nova model manufactured by the Data General Corporation. Similarly, the computer interface equipment 4 is also the general purpose Nova model of Data General Corporation. The computer and interface equipment are substantially the same as disclosed in application Ser. No. 286,088, to Nishimura et al. filed Sept. 5, 1972, and assigned to the same assignee as the present application. The computer 1 is connected to a magnetic disc 5 for storing computer control data and comprises a center or central processing unit 6 for processing the control data and transferring the processed data, and a memory means 7 for memorizing or storing the processed data. It is to be noted that the processed data will be referred to hereinbelow as "pulse distribution data" and a predetermined amount of the pulse distribution data as "one word" or "one word of the pulse distribution data".

The machine control unit 3 comprises shift registers 8X, 8Y, 8Z to each of which one word of the pulse distribution data is shifted through the center processing unit 6, interface 4 and data presetting circuits 17X, 17Y or 17Z at a particular time, and furthermore, shift pulse signals are applied from a pulse generator 9 through a switching circuit 10. The pulse generator 9 is connected to an F-register 55 which is, in turn, connected to the interface 4 so that the frequency of the shift pulse signals generated by the pulse generator may be changed according to the command from the computer 1. The shift pulse signals are utilized to shift the contents in the shift registers 8X, 8Y, 8Z one bit at a time, and supply drive pulse signals in accordance with the contents therein to NAND-gates 11X, 11Y, 11Z. The NAND-gates are also supplied with shift pulse signals from the switching circuit 10 directly so that the drive pulse signals from the NAND-gates are synchronized with the shift pulse signals.

A shift finish detecting circuit 13 detects that the contents in the shift registers 8X, 8Y, 8Z are completely shifted by counting the shift pulse signals, and then supplies a data control signal DC to the computer 1 through the interface 4 so as to control the supply of the pulse distribution data to the shift registers. In this manner, the drive pulse signals may be continuously supplied to pulse motors 2 through output gates 12. Each of subtracting counters 14X, 14Y, 14Z is supplied with the coordinate values of the terminal point of the segment machined in accordance with one block of the computer control data and the registered contents therein are subtacted one by one by the drive pulse signals supplied from the NAND-gates 11X, 11Y, 11Z through NOR-gates 19X, 19Y, 19Z. When all the contents are subtracted to zero, the subtracting counters 14X, 14Y, 14Z provide a control data demand signal to the computer 1 so that the computer 1 provides fresh words of pulse distribution data calculated based upon a fresh block of computer control data.

A mode register 15 for storing the information on the axes to be actuated and the directions of the feed motions is connected to the interface 4, to compensation detecting circuits 16X, 16Y, 16Z and to output gate 12. The mode register 15 controls the output gate 12 so that the pulse motors 2X, 2Y, 2Z are rotated in a required detecting. The compensation detecing circuits 16X, 16Y, 16Z detect the necessity of the backlash compensating operation and individually generate a compensating signal when the backlash compensating operation is required.

When the compensating signal is applied to the switching circuit 10, the switching circuit 10 supplies a signal to the NOR-gates 19X, 19Y, 19Z so that the subtracting counters 14X, 14Y, 14Z become temporarily inoperative.

The data presetting circuits 17X, 17Y, 17Z are respectively operable to supply the backlash compensating data registered or stored in backlash compensating circuits 18X, 18Y, 18Z to the shift registers 8X, 8Y, 8Z.

For example, when the necessity of the backlash compensating operating is detected on the X axis by the compensation detecting circuit 16X, the content of the circuit 18X is shifted to the shift register 8X by the aid of the data presetting circuit 17X and the shift register 8X, in turn, supplies drive pulse signals equivalent to the backlash compensating data to the NAND gate 11X. It is to be appreciated that the other shift registers 8Y, 8Z do not supply any pulse signals since the shift registers are empty.

When the backlash compensating operation is completed, the shift finish detecting circuit 13 provides the data control signal DC to the interface 4 whereby the data presetting circuits 17X, 17Y, 17Z supply the pulse distribution data to the shift registers 8X, 8Y, 8Z and the switching cirucit 10 provides feed shift pulse signals to the shift registers 8X, 8Y, 8Z.

Accordingly, the drive pulse signals are supplied in synchronism with the feed shift pulse signals to the pulse motors.

It is to be noted that the frequency of the shift pulse signals is decided by the information from the interface 4 to the F-register 55.

As mentioned above, the shift registers which are primarily provided for supplying drive pulse signals in accordance with the required frequency may be utilized for the compensation of the backlash, and the backlash compensating operation does not require any additional device which detects that the compensating operation has been properly performed. Consequently, the machine control unit 3 is simple in its construction, and the computer 1 may control an increased number of machine tools, since no additional load is applied to the computer 1 for compensating backlash.

Figure 2:
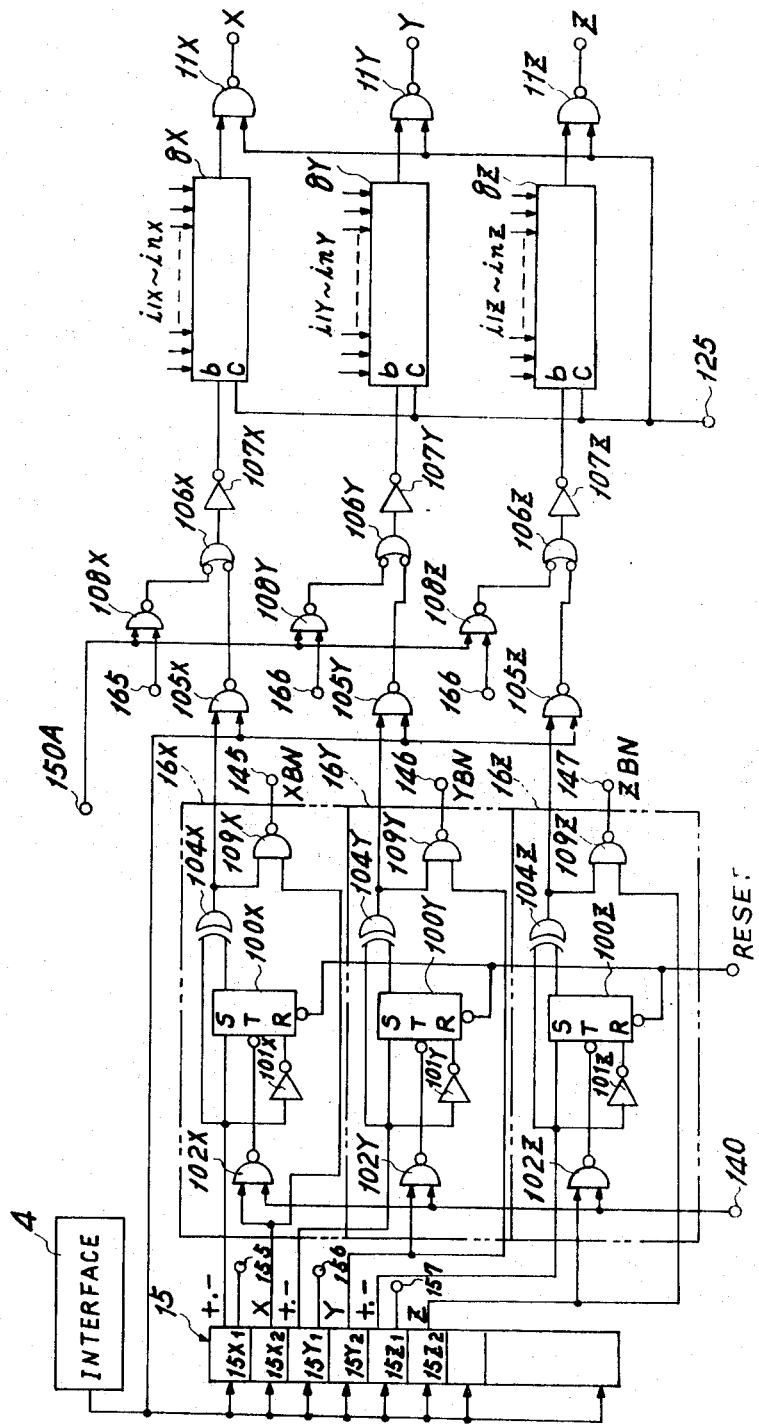
FIG. 2 is a schematic diagram of the compensation detecting circuits and shift registers used in the system shown in FIG. 1.

Referring now to FIG. 2, the mode register 15 for storing mode signals, such as the axes to be actuated and the directions of the feed motions, is connected to the computer 1 through the interface 4 and comprises flip-flops or units $15X_1$, $15X_2$, $15Y_1$, $15Y_2$, $15Z_1$, $15Z_2$ - - -.

When the binary coded number "1" or a binary "1" is shifted to the units $15X_1$, $15Y_1$, $15Z_1$, the same respectively direct the output gate 12 through terminals 155, 156, 157 so that the pulse motors 2 are rotated in the plus direction. Similarly, when the binary coded number "0" or a binary "0" is applied to the flip-flops $15X_1$, $15Y_1$, $15Z_1$, the same respectively direct the output gate 12 so that the pulse motors 2 are rotated in the minus direction. When a binary "1" is applied to the flip-flops $15X_2$, $15Y_2$, $15Z_2$, the same respectively order the start of the feed motion of the pulse motors, whereas when a binary "0" is supplied thereto, the same respectively direct stopping of the pulse motors 2.

The flip-flops $15X_1$, $15Y_1$, $15Z_1$, are respectively connected to the set input terminals S of J-K flip-flops 100X, 100Y, 100Z and also the reset input terminals R thereof through NOT-gates 101X, 101Y, 101Z. the J-K flip-flops 100X, 100Y, 100Z are provided to memorize or store the directions of the feed motions. The flip-flops $15X_2$, $15Y_2$, $15Z_2$ are respectively connected to the trigger input terminals T of the J-K flip-flops 100X, 100Y, 100Z through NAND-gates 102X, 102Y, 102Z so that when a NCBR signal (indicating that one block of pulse distribution data is completely shifted to the shift registers 8X, 8Y, 8Z) is supplied to the NAND-gates 102X, 102Y, 102Z through the terminal 140 from the interface 4, the signals from the flip-flops $15X_1$, $15Y_2$, $15Z_1$, are registered in the J-K flip-flops.

The output terminals at the set sides of the J-K flip-flops 100X, 100Y, 100Z and the flip-flops $15X_1$, $15Y_1$, $15Z_1$ are respectively connected to exclusive OR-gates 104X, 104Y, 104Z each of which generates a binary signal "1" only when the direction previously registered on the J-K flip-flop and the direction newly registered on the flip-flop are different from each other, that is, the inputs to the exclusive OR-gate are different.

It is to be appreciated that the information on the direction of the motion is stored at the first portion of the data and the direction of the feed motion is thus detected before the pulse distribution data are supplied to any of the shift registers 8X, 8Y, 8Z and compared with the direction previously registered on the J-K flip-flop, and the fresh directional signal is registered on the J-K flip-flop instead of the previous directional signal when the NCBR signal is supplied to any of the NAND gates 102X, 102Y, 102Z, that is, the pulse distribution data signals of one block are completely shifted to the shift register. The backlash compensating signal, the signal issued by the exclusive OR-gates, is supplied to the terminals b of the shift registers 8X, 8Y, 8Z through NAND-gates, (105X, 105Y, 105Z) and NOT-gates (107X, 107Y, 107Z). The backlash compensating signal is also supplied to the backlash compensating data presetting circuits 18X, 18Y, 18Z by the terminals 145, 146, 147 (only terminal 145 is shown in FIG. 4) through NAND-gates 109X, 109Y, 109Z which are respectively connected to the flip-flops $15X_2$, $15Y_2$, $15Z_2$.

The information on the backlash compensation is preset on each of the shift registers 8X, 8Y, 8Z through terminals $i_{1x}, i_{2x}, --- i_{nx}$ when a binary "0" is supplied to the terminals b thereof.

The contents in each of the shift registers 8X, 8Y, 8Z are shifted bit-by-bit when the shift pulses are supplied to the terminals c thereof, and a binary "1" is applied to the terminals b thereof.

NAND-gates 108X, 108Y, 108Z are respectively connected to the NAND-gates 106X, 106Y, 106Z at the output terminals thereof and at the input terminals thereof, are connected to the interface 4 so that when the pulse distribution data are required to be registered on the shift registers 8X, 8Y, 8Z, a binary "0" is applied to the terminal b thereof. The outputs of the exclusive OR-gates 104X, 104Y, 104Z and the flip-flops $15X_2$, $15Y_2$, $15Z_2$ of the register 15 are supplied to NAND gates 109X, 109Y, 109Z which, in turn, supply the outputs thereof to NAND-gates 110 (FIG. 3) through terminals 145, 146, 147.

Figure 3:
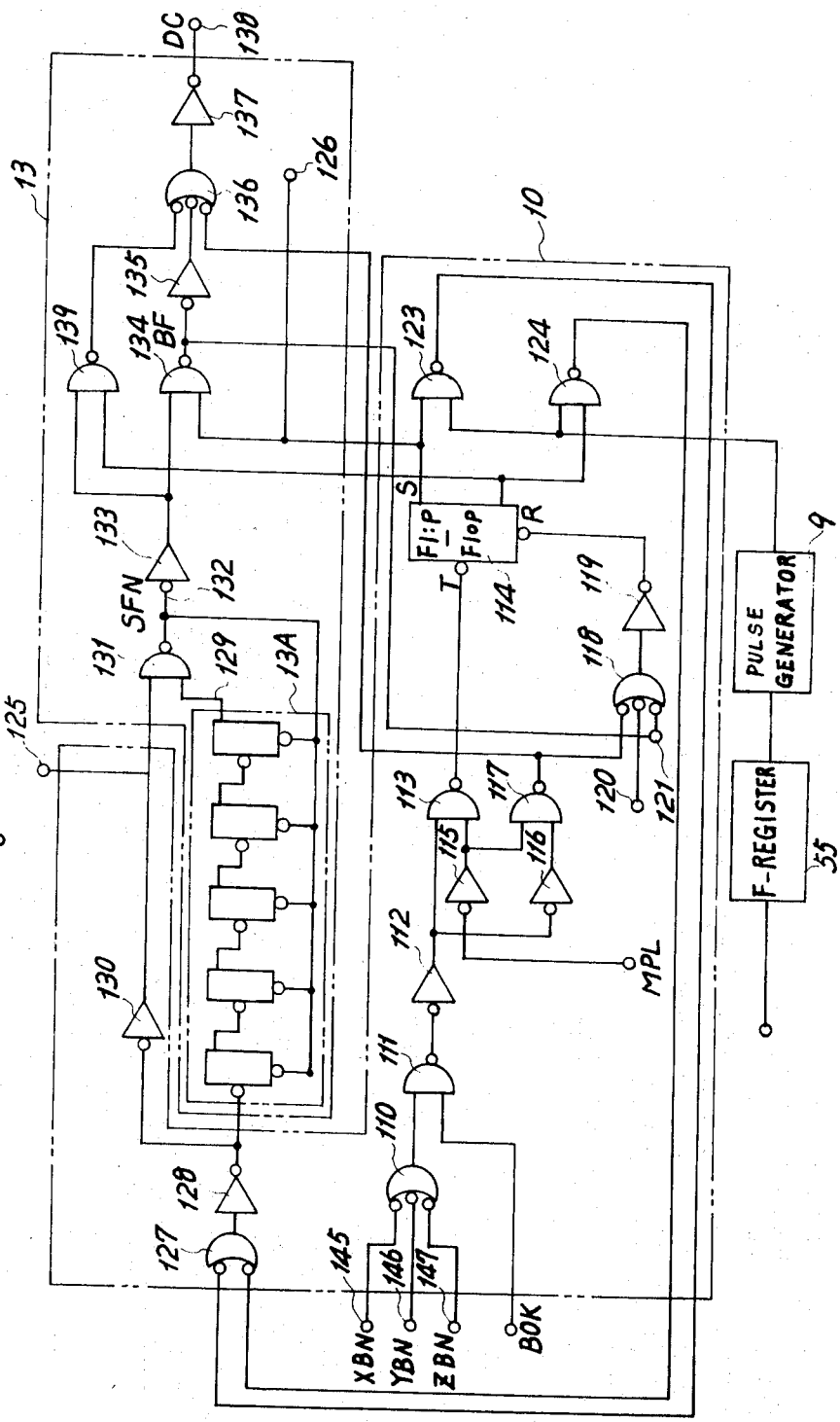
FIG. 3 is a schematic diagram of the switching circuit and a shift finish detecting circuit used in the system shown in FIG. 1; and, FIG. 4 is a schematic diagram of the data presetting circuit and a backlash compensating data presetting circuit for presetting pulse distribution data and compensation data in the shift register used in the system shown in FIG. 1.

As shown in FIG. 3, the output of the NAND-gate 110 is supplied to the trigger terminal T of the flip-flop 114 through NAND-gate 111, NOT-gate 112 and NAND-gate 113 so as to set the flip-flop 114. This output is also fed through an additional NOT-gate 116 and NAND-gate 117. As long as the backlash compensating signal is being applied to the NAND-gate 110, the NAND-gate 117 does not supply any signal to NAND-gates 136 and 118. Therefore, NOT-gate 137 does not generate the data control signal DC so that the interface 4 does not supply the pulse distribution data to the shift registers. The NAND-gate 111 is always supplied with a binary "1" through the input terminal BOK thereof except when the machining operation according to the first word of the pulse distribution data is performed.

The flip-flop 114 is reset when a reset signal is supplied through the terminal 120 to the NAND-gate 118 and the NOT-gate 119 to the reset terminal R at the very beginning of the machining operation and when a backlash compensating finish signal is also supplied through the terminal 121 to the reset terminal R and when an additional signal is supplied to the terminal MPL from the interface 4 when all the mode signals have been registered on the mode register 15.

The flip-flop 114 is capable of memorizing or storing the backlash compensating operation and of effecting the passage of a series of shift pulse signals from the pulse generator 9 through either of NAND-gates 123 or 124. The output terminals of the NAND-gates 123, 124 are connected to the counter 13 through NAND-gate 127 and NOT-gate 128. The output terminal of the NOT-gate 128 is further connected through a NOT-gate 130 and a terminal 125 to the shift registers 8X, 8Y, 8Z, to the NAND-gates 11X, 11Y, 11Z and to the NAND-gate 131.

The shift finish detecting circuit 13 includes the counter 13A which comprises a plurality of flip-flops and is to count the number of the shift pulse signals so as to generate a shift finish signal SFN at the output terminal 129 thereof when the same number of shift pulse signals as the number of the bits in the shift register has been supplied thereto. The output terminal 129 is connected to the NAND-gate 131 so that the output SFN through the terminal 132 is synchronized with the shift pulse signals. The S output terminal of the flip-flop 114 is connected through a terminal 126 to the NOR-gates 19X, 19Y, 19Z and to NAND gate 134. The NAND-gate 134 is also connected to the NAND-gate 131 through a NOT-gate 133 whereby the NAND-gate 134 generates a backlash compensation finish signal BF when the counting circuit 13A generates the shift finish signal SFN. The signal BF is supplied to NOT-gate 137 through NOT-gate 135 and NAND-gate 136, so as to generate data control signal DC at the output terminal 138, and is also supplied to the NAND-gate 118 so as to reset the flip-flop 114.

The data control signal DC is also generated at the terminal 138 and supplied to the interface 4 when the shift finish signal SFN is supplied through the NAND-gate 139 whose input terminal is connected to the reset terminal of the flip-flop 114, that is, when the pulse distribution in accordance with one word of the pulse distribution data is completed.

When the data control signal DC is supplied to the interface 4 immediately after the mode signals have been supplied to the mode register 15, the pulse distribution data are supplied to the input terminals $I_1, I_2, I_3, --- I_n$ of NAND-gate 142, shown in detail in FIG. 4. Thereafter, the interface 4 supplies a signal to the input terminal of a selected one of the NAND-gates 108X, 108Y, 108Z so that the pulse distribution data are registered on the selected shift register.

Suppose the shift register 8X is selected. The interface 4 then supplies the selecting signal through the terminal 165 to the NAND-gate 108X and also supplies signals through the terminals 150A (FIG. 2) and 150 so that a binary "0" is applied to the terminal b of the shift register 8X. Thus, the plus distribution data applied to the input terminals $I_1, I_2, I_3, --- I_n$ are registered in the shift register 8X by the aid of the NAND-gate 143.

NAND-gates 144A, 144B, 144C, 144D (See FIG. 4) are respectively connected to one, two, four and eight NAND-gates 143 at the output terminals thereof, and are connected at the input terminals thereof to NOT-gate 151 and to backlash setting switches $S_1, S_2, S_4,$ and $S_8$, respectively.

It is to be noted that the backlash setting switches $S_1, S_2, S_4$ and $S_8$ are operated manually or by commands from the computer 1.

The operation of the system in compensating for backlash will now be described.

Suppose the direction and the axis of the feed motion required by the first block of the data are respectively (+) and (X), a binary "1" is registered on the flip-flops $15X_1, 15X_2$ of the register 15. When the pulse distribution data in the first block of the data is completely shifted to the shift register 8X, the flip-flop 100X is reversed by the NCBR signal through the terminal 140 to be set for memorizing the direction of the motion in accordance with the first block of the data.

Supposing, the direction and the axis of the motions directed by the second block of data are respectively (−) and (X). The flip-flop $15X_2$ remains as before, but the flip-flop $15X_1$ is reversed by the application of a binary "0".

Accordingly, the input signals to the exclusive OR-gate 104X become different from each other and thus, the same generates a backlash compensating signal or binary "" which is operative to supply a binary "0" to the terminal b of the shift register 8X. The NAND-gate 109X also supplies the backlash compensating signal to the backlash data presetting circuit 18X and to the switching circuit 10. By the application of the backlash compensating signal to the terminal 145, the NAND-gate 117 does not generate any signal, even if the mode shift finish signal is applied through the terminal MPL and NOT-gate 115 from the interface 4 after the mode signals are shifted to the mode register 15. Accordingly, the NOT-gate 137 does not supply the data control signal to the interface 4 and thus, the same does not supply the pulse distribution data to the data presetting circuit 17X. Furthermore, the NAND-gate 113 supplies a triggering signal to the terminal T of the flip-flop 114 to thereby reverse the same, which, in turn, supplies the signal to the NOR-gate 19X to make the subtracting counter 14X inoperative.

On the other hand, the backlash compensating data presetting circuit 18X supplies the backlash compensating data to the shift register 8X by the application of the backlash compensating signal through the terminal 145 and the NOT-gate 151. The backlash compensating data is indicated by the backlash setting switches $S_1$, $S_2$, $S_4$, and $S_8$. For example, when the backlash compensating value is equivalent to five pulses, the switches $S_1$, $S_4$ are closed manually or by the command from the computer 1 and thus, a binary "1" is supplied to the terminals $i_{1x}$, $i_{4x}$, $i_{5x}$, $i_{6x}$ and $I_{nx}$ so that the five bits in the shift register 8X are supplied with a binary "1".

A pulse generating signal is supplied to the pulse generator 9 and thus, a series of pulse signals are applied to the counter 13A, the shift register 8X and the NAND-gate 11X. Therefore, the contents of the shift register 8X are shifted bit-by-bit as each of the compensating shift pulse signals is applied, so that five pulse signals are supplied to the X axis pulse motor 2X to compensate the backlash in synchronism with the compensating shift pulses. When the shift finish detecting circuit 13A detects the fact that the shifting is completed, that is, shift pulse signals of the same number as the number of bits in the shift register are supplied to the shift register, the circuit 13A provides the shift finish signal SFN to the terminal 132, whereby the NAND-gate 134 provides the backlash compensation finish signal BF. Accordingly, the NOT-gate 137 generates a data control signal DC which is supplied to the interface 4 through the terminal 138. Upon receiving the signal DC, the interface 4 supplies fresh pulse distribution data to the terminals $I_1$, $I_2$ - - - $I_n$ of the NAND-gates 142 (FIG. 4). Thereafter, the interface 4 supplies signals to the terminal 150 and the NAND-gate 108X so that a binary "0" is applied to the terminal b of the shift register 8X, and the pulse distribution data supplied to the input terminals $I_1$, $I_2$ - - - $I_n$ are shifted to be registered on the shift register 8X. The signal BF is also supplied to the terminal 121, and therefore, the flip-flop 114 is reset so that the NAND-gate 124 may pass the pulse signals from the pulse generator 9, and the subtracting counter 14X again becomes operative.

When the registration of the pulse distribution data is finished, a pulse generating signal is applied to the pulse generator 9 so as to apply the feed shift pulse signals to the register 8X so that the drive pulse signals are supplied through the NAND-gate 11X to the X axis pulse motor 2X.

It is to be appreciated that the above description relates to the X axis only. However, it will be apparent to those skilled in the art that the backlash compensating operation on the Y, Z axes is substantially the same. Furthermore, it will be understood that backlash compensation may be made on a plurality of axes at the same time with the apparatus of the present invention.

Obviously, many modifications and variations of the present invention are possible in light of the above teachings. It is therefore to be understood that, within the scope of the appended claims, the invention may be practiced otherwise than as specifically described.

What is claimed as new and desired to be secured by Letters Patent of the United States is:

1. In a computer controlled machine tool control system including:

a computer for controlling the operation of a machine tool in accordance with computer control data, shift register means operably connected to said computer to receive a predetermined amount of pulse distribution data therefrom, said shift register means being capable of providing drive pulse signals to pulse motors in accordance with said pulse distribution data, pulse generating means for generating a series of pulse signals at a frequency determined by said computer control data, said pulse signals being supplied to said shift register means to trigger said drive pulse signals provided by said shift register means;

shift finish detecting means for counting the number of said pulse signals supplied to said shift register means, counter means connected to said shift register means for counting the number of drive pulse signals supplied to said pulse motors, the improvement comprising:

a backlash compensating apparatus including backlash compensation detecting means connected to said computer and providing first signals when the direction of the existing feed motion is different from the previous direction thereof, compensation data presetting means responsive to one of said first signals to supply backlash compensation data to said shift register means and, switching means responsive to another of said first signals for stopping the supply of said pulse distribution data to said shift register means and making said counter means inoperative, said shift finish detecting means being capable of generating a backlash compensation finish signal when a predetermined number of said pulse signals is applied to said shift register means.

2. A system as in claim 1, wherein said backlash compensating apparatus further comprises:

mode register means connected to said computer for storing signals corresponding to the direction and the axis of feed motion, and said backlash compensation detecting means comprises a first flip-flop means operably connected to said mode register means, first gate means connected to said mode register and said first flip-flop means so as to register the direction of said feed motion in said first flip-flop means, and second gate means connected to said mode register and said first gate means so as to generate a backlash compensating signal when the directions of the previous feed motion and the existing feed motion are different from each other.

3. A system as in claim 1, wherein said compensation data presetting means comprises:
a plurality of first gate means connected to said compensation detecting means, each of said first gate means being connected to a predetermined number of second gate means which are connected to said shift register means, and a plurality of backlash setting switches connected to to said first gate means so as to supply said backlash compensating data to said shift register means.

4. A system as in claim 1, wherein said backlash compensating apparatus further comprises:
a data presetting means for presetting pulse distribution data to said shift register means and operably connected to said computer.

5. A system as in claim 4, wherein said switching means comprises:
gate means connected to said computer and said backlash compensation detecting means for initiating a data control signal so that said computer supplies pulse distribution data to said data presetting means when said backlash compensation detecting means does not provide said first signals.

6. A system as in claim 1, where said switching means comprises:
gate means connected to said backlash compensation detecting means, and flip-flop means connected to said gate means, said gate means being operable to provide a signal to said flip-flop means in response to said other of said first signals so that said flip-flop means makes said counter means inoperative.

* * * * *